(12) United States Patent
Liu et al.

(10) Patent No.: US 10,616,659 B2
(45) Date of Patent: Apr. 7, 2020

(54) TELEVISION COLOR CAST ADJUSTMENT METHOD AND APPARATUS

(71) Applicant: SHENZHEN TCL NEW TECHNOLOGY CO., LTD, Shenzhen, Guangdong (CN)

(72) Inventors: Shubiao Liu, Shenzhen (CN); Jianyuan Lin, Shenzhen (CN); Honglei Ji, Shenzhen (CN); Dongcan Zhang, Shenzhen (CN); Erchao Yang, Shenzhen (CN); Jianshun Huang, Shenzhen (CN); Chonghui Luo, Shenzhen (CN)

(73) Assignee: SHENZHEN TCL NEW TECHNOLOGY CO., LTD., Shenzhen (CN)

(*) Notice: Subject to any disclaimer, the term of this patent is extended or adjusted under 35 U.S.C. 154(b) by 0 days.

(21) Appl. No.: 16/342,156

(22) PCT Filed: Dec. 27, 2016

(86) PCT No.: PCT/CN2016/112466
§ 371 (c)(1),
(2) Date: Apr. 15, 2019

(87) PCT Pub. No.: WO2018/068404
PCT Pub. Date: Apr. 19, 2018

(65) Prior Publication Data
US 2019/0261058 A1    Aug. 22, 2019

(30) Foreign Application Priority Data

Oct. 13, 2016  (CN) .......................... 2016 1 0895108

(51) Int. Cl.
H04N 21/485   (2011.01)
H04N 9/73   (2006.01)
H04N 21/431   (2011.01)

(52) U.S. Cl.
CPC .......... H04N 21/4854 (2013.01); H04N 9/73 (2013.01); H04N 21/4312 (2013.01)

(58) Field of Classification Search
None
See application file for complete search history.

(56) References Cited

U.S. PATENT DOCUMENTS 8,390,656 B2   3/2013 Muroi et al.
9,678,394 B2   6/2017 He
(Continued)

FOREIGN PATENT DOCUMENTS

CN   101192382 A   6/2008
CN   102077267 A   5/2011
(Continued)

OTHER PUBLICATIONS

International search report dated Jul. 11, 2017 from corresponding application No. PCT/CN2016/112466.
(Continued)

*Primary Examiner* — Samira Monshi
(74) *Attorney, Agent, or Firm* — Hauptman Ham, LLP

(57) ABSTRACT

Disclosed is a television color cast adjustment method, including: dividing a television display screen into a plurality of areas according to a predetermined manner; determining an adjustment coefficient of red light and an adjustment coefficient of blue light in each area according to a position of each area relative to a light bar for the television display screen; adjusting initial image in each area according to the adjustment coefficients of red light and blue light thereof, and displaying the adjusted image in each area on the (Continued)

television display screen. Disclosed is also a television color cast adjustment apparatus. The present disclosure may solve the problem that the color cast appears on television display screens which is caused by the glass light guide plate, thus the viewing effect of TVs is improved.

10 Claims, 3 Drawing Sheets

(56) References Cited

U.S. PATENT DOCUMENTS

| | | |
|---|---|---|
| 9,977,283 B2 | 5/2018 | Liu |
| 2011/0090265 A1 | 4/2011 | Muroi et al. |
| 2015/0268408 A1* | 9/2015 | Ohta ................. G02F 1/133603 349/65 |
| 2016/0187734 A1 | 6/2016 | He |
| 2018/0046030 A1 | 2/2018 | Liu |

FOREIGN PATENT DOCUMENTS

| | | |
|---|---|---|
| CN | 103871373 A | 6/2014 |
| CN | 104483785 A | 4/2015 |
| CN | 105355182 A | 2/2016 |
| CN | 205065312 U | 3/2016 |
| CN | 105700235 A | 6/2016 |
| JP | 2014095810 A | 5/2014 |

OTHER PUBLICATIONS

Office Action dated Mar. 21, 2019 from corresponding application No. CN 201610895108.0.

* cited by examiner

TELEVISION COLOR CAST ADJUSTMENT METHOD AND APPARATUS

RELATED APPLICATIONS

The present application is a National Phase of International Application Number PCT/CN2016/112466, filed Dec. 27, 2016, and claims the priority of China Application No. 201610895108.0, filed Oct. 13, 2016.

FIELD

The present disclosure relates to the field of television display technology, and more particularly relates to a television color cast adjustment method and a television color cast adjustment apparatus.

BACKGROUND

At present, ultra-thin TV has become a trend of television developing. Glass light guide plate is now the element which can be used to pursue a thinner television. However, due to the fact that the glass light guide plate has a large difference in refractive index for light of different colors, the side of display screen close to light bar appears in shades of blue, and the side of the display screen away from the light bar appears in shades of red, which affects viewing effect of TVs.

SUMMARY

It is one objective of the present disclosure to provide a television color cast adjustment method and a television color cast adjustment apparatus, aiming to solve the technical problem in the prior art that the color cast appears on television display screens which is caused by the glass light guide plate, thereby improving the viewing effect of TVs.

In order to realize the above aim, the present disclosure provides a television color cast adjustment method. The method includes the following operations:

dividing a television display screen into a plurality of areas according to a predetermined manner;

determining an adjustment coefficient of red light and an adjustment coefficient of blue light in each area, according to a position of each area relative to a light bar for the television display screen; and adjusting initial image in each area according to the adjustment coefficient of red light and the adjustment coefficient of blue light thereof, and displaying the adjusted image in each area on the television display screen.

In some embodiments, the operation of dividing a television display screen into a plurality of areas according to a predetermined manner includes:

dividing the television display screen into N areas along a direction parallel to the light bar for the television display screen, N being a positive integer.

In some embodiments, the operation of determining an adjustment coefficient of red light and an adjustment coefficient of blue light in each area, according to a position of each area relative to a light bar for the television display screen includes:

determining a gain compensation coefficient of red light and a gain compensation coefficient of blue light in each area; and respectively determining the adjustment coefficient of red light and the adjustment coefficient of blue light in each area, according to the position of each area relative to the light bar for the television display screen, the gain compensation coefficient of red light thereof, and the gain compensation coefficient of blue light thereof; the farther the distance of each area to the light bar for the television display screen, the smaller the adjustment coefficient of red light thereof, and the greater the adjustment coefficient of blue light thereof.

In some embodiments, the operation of respectively determining the adjustment coefficient of red light and the adjustment coefficient of blue light in each area according to the position of each area relative to the light bar for the television display screen, the gain compensation coefficient of red light thereof, and the gain compensation coefficient of blue light thereof includes:

obtaining an adjustment coefficient of red light $C_R(n)$ in the nth area by an equation $$C_R(n) = \frac{(k_R + k_B)/2}{N} * \frac{a}{255} * (N - b*n);$$

obtaining an adjustment coefficient of blue light $C_B(n)$ in the nth area by an equation $$C_B(n) = \frac{(k_R + k_B)/2}{N} * \frac{a}{255} * (c*n - N);$$

$k_R$ refers to the number of times of total internal reflection needed for the red light to pass through a television glass light guide plate, $k_B$ refers to the number of times of total internal reflection needed for the blue light to pass through the television glass light guide plate, "a" refers to a predetermined color gain value in each area, "b" refers to the gain compensation coefficient of red light in the nth area that is relative to the light bar for the television display screen, "c" refers to the gain compensation coefficient of blue light in the nth area that is relative to the light bar for the television display screen, N refers to the quantity of the divided areas, and "n" is a positive integer and n≤N.

In some embodiments, the operation of adjusting initial image in each area according to the adjustment coefficient of red light and the adjustment coefficient of blue light thereof includes:

obtaining image information of the adjusted image $A_R(n)$, $A_G(n)$, and $A_B(n)$ in the nth area, by equations:

$$A_R(n) = B_R(n) * [1 + C_R(n)],$$

$$A_G(n) = B_G(n) * 1,$$

$$A_B(n) = B_B(n) * [1 + C_B(n)];$$

$B_R(n)$, $B_G(n)$, and $B_B(n)$ refer to three color channels of red (R), green (G), and blue (B), corresponding to the initial image in the nth area.

In addition, in order to realize the above aim, the present disclosure also provides a television color cast adjustment apparatus. The apparatus includes:

a dividing module, configured to divide a television display screen into a plurality of areas according to a predetermined manner;

a determining module, configured to determine an adjustment coefficient of red light and an adjustment coefficient of blue light in each area, according to a position of each area relative to a light bar for the television display screen; and an adjusting module, configured to adjust initial image in each area according to the adjustment coefficient of red light and the adjustment coefficient of blue light thereof, and displaying the adjusted image in each area on the television display screen.

In some embodiments, the dividing module is configured to:

divide the television display screen into N areas along a direction parallel to the light bar for the television display screen, N being a positive integer.

In some embodiments, the determining module specifically includes:

a first determining module, configured to determine a gain compensation coefficient of red light and a gain compensation coefficient of blue light in each area; and a second determining module, configured to respectively determine the adjustment coefficient of red light and the adjustment coefficient of blue light in each area, according to the position of each area relative to the light bar for the television display screen, the gain compensation coefficient of red light thereof, and the gain compensation coefficient of blue light thereof; the farther the distance of each area to the light bar for the television display screen, the smaller the adjustment coefficient of red light thereof, and the greater the adjustment coefficient of blue light thereof.

Preferably, the second determining module is specifically configured to:

obtain an adjustment coefficient of red light $C_R(n)$ in the nth area by an equation $$C_R(n) = \frac{(k_R + k_B)/2}{N} * \frac{a}{255} * (N - b*n);$$

obtain an adjustment coefficient of blue light $C_B(n)$ in the nth area by an equation $$C_B(n) = \frac{(k_R + k_B)/2}{N} * \frac{a}{255} * (c*n - N);$$

$k_R$ refers to the number of times of total internal reflection needed for the red light to pass through a television glass light guide plate, $k_B$ refers to the number of times of total internal reflection needed for the blue light to pass through the television glass light guide plate, "a" refers to a predetermined color gain value in each area, "b" refers to the gain compensation coefficient of red light in the nth area that is relative to the light bar for the television display screen, "c" refers to the gain compensation coefficient of blue light in the nth area that is relative to the light bar for the television display screen, N refers to the quantity of the divided areas, and "n" is a positive integer and n≤N.

In some embodiments, the adjusting module is configured to:

obtain image information of the adjusted image $A_R(n)$, $A_G(n)$, and $A_B(n)$ in the nth area, by equations:

$A_R(n)=B_R(n)*[1+C_R(n)]$, $A_G(n)=B_G(n)*1$, $A_B(n)=B_B(n)*[1+C_B(n)]$;

$B_R(n)$, $B_G(n)$, and $B_B(n)$ refer to three color channels of red (R), green (G), and blue (B), corresponding to the initial image in the nth area.

The present disclosure provides a television color cast adjustment method and a television color cast adjustment apparatus. The method includes: dividing a television display screen into a plurality of areas according to a predetermined manner; determining an adjustment coefficient of red light and an adjustment coefficient of blue light in each area according to a position of each area relative to a light bar for the television display screen; adjusting an initial image in each area according to the adjustment coefficients of red light and blue light thereof, and displaying the adjusted image in each area on the television display screen. The present disclosure, by dividing the television display screen into the plurality of areas, determining the adjustment coefficients of red light and blue light in each area, adjusting the image in each area according to the adjustment coefficients of red light and blue light thereof, and displaying the adjusted image in each area on the television play screen, may solve the problem that the color cast appears on television display screens, which is caused by the glass light guide plate, thus the viewing effect of TVs is improved.

The realizing of the aim, functional characteristics and advantages of the present disclosure are further described in detail with reference to the accompanying drawings and the embodiments.

DETAILED DESCRIPTION OF THE EMBODIMENTS

The technical solutions in the embodiments of the present disclosure will be described combining the drawings in the embodiments of the present disclosure. It should be understood that, the preferred embodiments described herein are not to be interpreted as limiting, but merely for illustrative purposes. In addition, without conflict, the technical solutions between the various embodiments of the present disclosure may be combined with each other.

Figure 1:
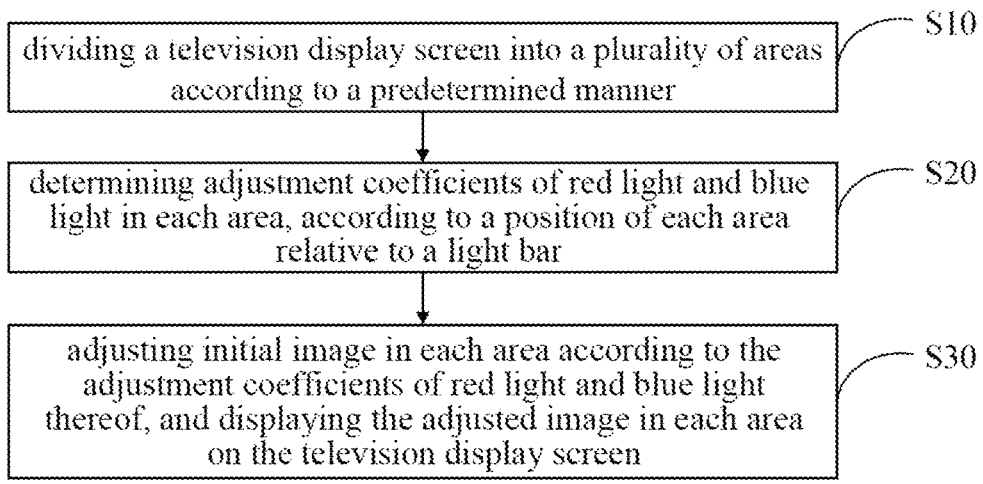
FIG. 1 is an illustrative flowchart of a first embodiment of a television color cast adjustment method according to the present disclosure.

Referring to FIG. 1, FIG. 1 is an illustrative flowchart of a first embodiment of a television color cast adjustment method according to the present disclosure. In this embodiment, the television color cast adjustment method includes:

Step S10, dividing a television display screen into a plurality of areas according to a predetermined manner.

Because the refractive index of the glass light guide plate varies with the color of the light passing through the glass light guide plate, the number of times of refractions for light to pass through the glass light guide plate varies with the color of the light. In addition, as the propagation distance increases, for different colors of light, spilling light in different areas is different. In this embodiment, the television display screen is divided into a plurality of areas according to the predetermined division manner, so that color cast in the displayed image of each area can be respectively adjusted.

The television display screen is divided into N areas along a direction parallel to a light bar for the television display screen, N being a positive integer.

The television display screen is equally divided into N areas of the same size along the direction parallel to the light bar for the television display screen, or the television display screen is divided into N areas of different sizes along the direction parallel to the light bar behind the television display screen. For example, considering the fact that the color cast in the area close to the light bar or away from the light bar is more obvious, and the color cast in the central area is weaker, the size of the area close to or away from the light bar may be smaller than the size of the central area, when dividing the television display screen.

Step S20, determining an adjustment coefficient of red light and an adjustment coefficient of blue light in each area, according to a position of each area relative to a light bar for the television display screen.

In this embodiment, because each area is at a different position relative to the light bar, the intensity of spilling light may also be different in different areas. For example, the spilling blue light in the area close to the light bar is more than the spilling blue light in the area away from the light bar. That is, in different areas relative to the light bar, the adjustment range for red light is different with the adjustment rang for blue light. In this embodiment, according to the position of each area relative to the light bar, the adjustment coefficient of red light and the adjustment coefficient of blue light in each area are determined.

Step S30, adjusting initial image in each area according to the adjustment coefficient of red light and the adjustment coefficient of blue light thereof, and displaying the adjusted image in each area on the television display screen.

In this embodiment, after determining the adjustment coefficients of the red light and the blue light in each area, the initial image in each area is adjusted according to the adjustment coefficients of the blue light and the red light thereof. The initial image in each area is adjusted, and then the adjusted image in each area is displayed on the television display screen.

In this embodiment, the television display screen is divided into a plurality of areas according to a predetermined manner. The adjustment coefficient of red light and the adjustment coefficient of blue light in each area are determined according to the position of each area relative to the light bar. The initial image in each area is adjusted according to the adjustment coefficient of red light and the adjustment coefficient of blue light thereof. The adjusted image in each area is then displayed on the television display screen. This embodiment, by dividing the television display screen into the plurality of areas, determining the adjustment coefficients of red light and blue light in each area, adjusting the image in each area according to the adjustment coefficients of red light and blue light thereof, and then displaying the adjusted image in each area on the television play screen, may solve the problem that the color cast appears on the television display screen which is caused by the glass light guide plate, thus the viewing effect of TVs is improved.

Figure 2:
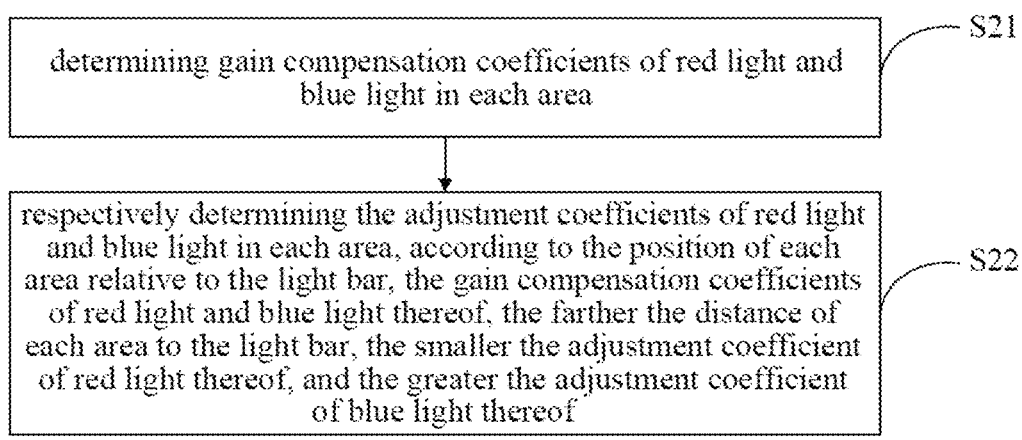
FIG. 2 is a detailed illustrative flowchart of step S20 shown in FIG. 1 of the present disclosure.

Further, referring to FIG. 2, FIG. 2 is a detailed illustrative flowchart of step S20 shown in FIG. 1 of the present disclosure. Based on the above embodiment as shown in FIG. 1, in this embodiment, the step S20 includes:

Step S21, determining a gain compensation coefficient of red light and a gain compensation coefficient of blue light in each area.

In this embodiment, the gain compensation coefficient of red light and the gain compensation coefficient of blue light in each area are determined, by testing and comparing the viewing effects of the television display screen multiple times. For example, after setting different gain compensation coefficients of red light and gain compensation coefficients of blue light in a same area of two or more television display screens, and inputting a same image at a same time, the television display screen with the best viewing effect is selected out. The gain compensation coefficient of red light and the gain compensation coefficient of blue light corresponding to the television display screen with the best viewing effect are taken as the gain compensation coefficient of red light and the gain compensation coefficient of blue light in this embodiment.

Step S22, respectively determining the adjustment coefficient of red light and the adjustment coefficient of blue light in each area, according to the position of each area relative to the light bar for the television display screen, the gain compensation coefficient of red light thereof, and the gain compensation coefficient of blue light thereof; the farther the distance of each area to the light bar for the television display screen, the smaller the adjustment coefficient of red light thereof, and the greater the adjustment coefficient of blue light thereof.

In this embodiment, the adjustment coefficient of red light and the adjustment coefficient of blue light in each area are respectively determined, according to the position of each area relative to the light bar, the gain compensation coefficient of red light and the gain compensation coefficient of blue light thereof. The adjustment coefficient of red light in the area is inversely proportional to the distance of the area to the light bar, namely, the farther the area is to the light bar, the smaller the adjustment coefficient of red light is. The adjustment coefficient of blue light in the area is proportional to the distance of the area to the light bar, namely, the closer the area is to the light bar, the larger the adjustment coefficient of blue light is.

In this embodiment, the gain compensation coefficients of the red light and the blue light in each area are determined; then, the adjustment coefficients of the red light and the blue light in each area are respectively determined, according to the position of each area relative to the light bar, the gain compensation coefficient of red light and the gain compensation coefficient of blue light thereof. The farther the area is to the light bar, the smaller the adjustment coefficient of red light in the area is, and the larger the adjustment coefficient of blue light in the area is. The initial image in each area can be respectively adjusted according to the adjustment coefficients of the red light and the blue light in each area, and then the adjusted image in each area can be displayed on the television display screen.

Figure 3:
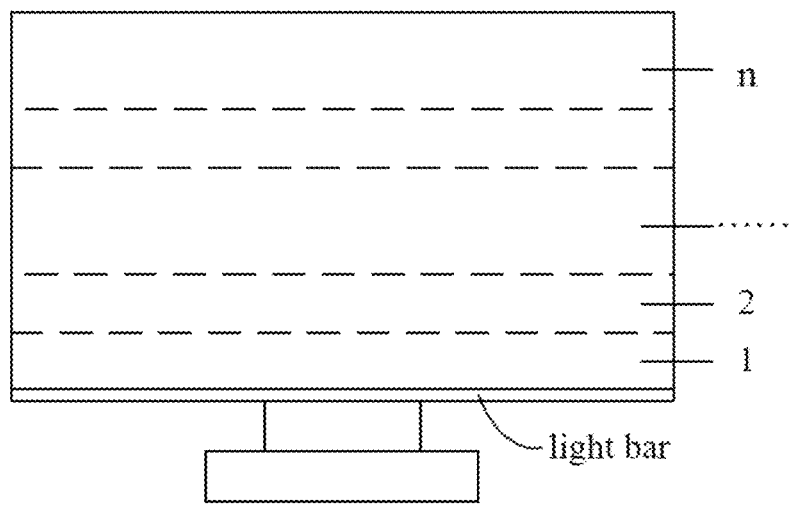
FIG. 3 is a schematic diagram of the television display screen being divided into the areas according to the television color cast adjustment method of the present disclosure.

Further, for a better explanation of the television color cast adjustment method, reference to FIG. 3, FIG. 3 is a schematic diagram of the television display screen being divided into the areas according to the television color cast adjustment method of the present disclosure. If the light bar is at the bottom of the television display screen (the light bar may be at the top of the television display screen, or at the left or right end of the television display screen), the area closest to the light bar is the first area, the area away from the light bar is the nth area, n is less than or equal to the total number of the areas N.

Based on the above embodiment as shown in FIG. 1, in this embodiment, the adjustment coefficient of red light $C_R(n)$ in the nth area is obtained by an equation $$C_R(n) = \frac{(k_R + k_B)/2}{N} * \frac{a}{255} * (N - b*n);$$

the adjustment coefficient of blue light $C_B(n)$ in the nth area is obtained by an equation $$C_B(n) = \frac{(k_R + k_B)/2}{N} * \frac{a}{255} * (c*n - N).$$

$k_R$ refers to the number of times of total internal reflection needed for the red light to pass through a television glass light guide plate, $k_B$ refers to the number of times of total internal reflection needed for the blue light to pass through the television glass light guide plate, "a" refers to a predetermined color gain value in each area, "b" refers to the gain compensation coefficient of red light in the nth area that is relative to the light bar for the television display screen, "c" refers to the gain compensation coefficient of blue light in the nth area that is relative to the light bar for the television display screen, N refers to the quantity of the divided areas, and "n" is a positive integer and n≤N.

$k_R$ and $k_B$ may be calculated by:

using the refractive index for light in medium n=c/v=1/sin C (c is the propagation speed of light in vacuum, v is the propagation speed of light in the medium, C is the total reflection angle for light in the medium), and the propagation speed of light in the medium v=f*λ, (λ is the wavelength of light), wherein, the frequency of light f propagating in the medium is constant. Taking a 55-inch television glass light guide plate as an example: if the length of the television glass light guide plate is 710 mm, the thickness is 3 mm, the refractive index for red light in the glass light guide plate is 1.21, the refractive index for blue light in the glass light guide plate is 1.86; according to $$C = \arcsin\frac{1}{n},$$

the total reflection angle of red light in the glass light guide plate is calculated to be 55.6°, and the total reflection angle of blue light in the glass light guide plate is calculated to be is 31°; and if that a beam of light is incident from the side of the glass light guide plate along the length of the glass light guide plate, and is emitted from the other side, then the number of times of total internal reflections for the beam of light to pass through the glass light guide plate is 710/(3*tan C). Thus, it can be calculated that the number of times of total internal reflections for red light to pass through the glass light guide plate is 154, and the number of times of total internal reflections for blue light to pass through the glass light guide plate is 364.

In this embodiment, for the purpose of a smooth transition between adjusted images in adjacent areas when displaying, so as to improve viewing effect, the color gain value a is predetermined in each area. The color gain value a in each area may be determined according to a backlight intensity of each area in the television display screen. In this embodiment, the value of a is preferably between 0 and 10.

Each color has 256 levels of brightness when displaying the image. The color has the weakest brightness at 0 level, and the color has the strongest brightness at 255 level. In this embodiment, a/255 represents the ratio of the color gain a in each area to the highest level of color brightness.

For the adjustment coefficient of red light $C_R(n)$ in the nth area, with the increasing value of n, the value of "N−b*n" gradually decreases, and the adjustment coefficient of red light $C_R(n)$ in the nth area also gradually decreases; for the adjustment coefficient of blue light $C_B(n)$ in the nth area, with the increasing value of n, the value of "c*n−N" gradually increases, and the adjustment coefficient of blue light $C_B(n)$ in the nth area also gradually increases.

In this embodiment, the adjustment coefficients of the red light and the blue light in each area are respectively determined according to the position of each area relative to the light bar, the gain compensation coefficients of the red light and the blue light in each area. With the increasing distance of the area to the light bar, the adjustment coefficient of red light thereof gradually decreases, the adjustment coefficient of blue light thereof gradually increases. As such, more red light is compensated in the area close to the light bar, more blue light is compensated in the area away from the light bar, which solves the problem that television display screens have the color cast caused by the use of the glass light guide plate, improving the viewing effect of TVs.

Further, based on the above embodiment as shown in FIG. 1, in this embodiment, the operation of adjusting an initial image in each area according to the adjustment coefficient of red light and the adjustment coefficient of blue light in each area includes:

obtaining image information of the adjusted image $A_R(n)$, $A_G(n)$, $A_B(n)$ in the nth area, by equations:

$$A_R(n)=B_R(n)*[1+C_R(n)],$$

$$A_G(n)=B_G(n)*1,$$

$$A_B(n)=B_B(n)*[1+C_B(n)];$$

$B_R(n)$, $B_G(n)$, $B_B(n)$ refer to three color channels of red (R), green (G), and blue (B), corresponding to the initial image in the nth area.

In this embodiment, the person skilled in the art can understand that each image includes one or more color channels. For example, the RGB image includes three color channels of red (R), green (G), and blue (B), each color channel stores information of color elements in the image. The colors in all the color channels come together to create the full color of pixels in the image.

In this embodiment, image information in each area varies with the adjustment coefficients of red light and blue light. When $C_R(n)=0$, $A_R(n)=B_R(n)$, meaning that it is neither to increase nor decrease red light in the area; when $C_R(n)>0$, $A_R(n)>B_R(n)$, meaning that it is to increase red light in the area, and with the increasing value of $C_R(n)$, the increased red light is more; when $C_R(n)<0$, $A_R(n)<B_R(n)$, meaning that it is to decrease red light in the area, and with the decreasing value of $C_R(n)$, the decreased red light is more. In addition, when $C_B(n)=0$, $A_B(n)=B_B(n)$, meaning that it is neither to increase nor decrease blue light in the area; when $C_B(n)>0$, $A_B(n)>B_B(n)$, meaning that it is to increase blue light in the area, and with the increasing value of $C_R(n)$, the increased blue light is more; when $C_B(n)<0$, $A_B(n)<B_B(n)$, meaning that it is to decrease blue light in the area, and with the decreasing value of $C_R(n)$, the decreased blue light is more.

Because the number of times of total internal reflections for green light to pass through the television glass light guide plate is between that for red light and that for blue light, green light in each area of the television display screen is not adjusted, namely $A_G(n)=B_G(n)$.

After adjusting initial image information $B_R(n)$, $B_G(n)$ in each area, and $B_B(n)$, the adjusted image information $A_R(n)$, $A_G(n)$, and $A_B(n)$ is displayed on the television display screen.

In this embodiment, the initial image in each area is adjusted according to the adjustment coefficient of red light and the adjustment coefficient of blue light in each area. As such, more red light is compensated in the area close to the light bar, more blue light is compensated in the area away from the light bar; or more blue light is reduced in the area close to the light bar, more red light is reduced in the area away from the light bar. After that, the adjusted images are displayed on the television display screen, which may solve the problem that color cast appears on television display screens which is caused by the glass light guide plate, thus the viewing effect of TVs is improved.

Figure 4:
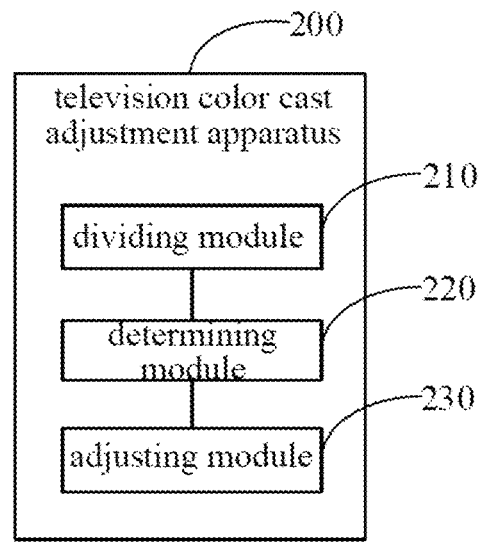
FIG. 4 is a functional module diagram of a first embodiment of a television color cast adjustment apparatus according to the present disclosure.

Referring to FIG. 4, FIG. 4 is a functional module diagram of a first embodiment of a television color cast adjustment apparatus according to the present disclosure. In this embodiment, the television color cast adjustment apparatus 200 includes:

a dividing module 210, configured to divide a television display screen into a plurality of areas according to a predetermined manner.

Because the refractive index of the glass light guide plate varies with the color of the light passing through the glass light guide plate, the number of times of refractions for light to pass through the glass light guide plate varies with the color of the light. In addition, as the propagation distance increases, for different colors of light, spilling light in different areas is different. In this embodiment, the television display screen is divided into a plurality of areas according to the predetermined division manner, so that color cast in the displayed image of each area can be respectively adjusted.

The television display screen is divided into N areas along a direction parallel to a light bar for the television display screen, N being a positive integer.

The television display screen is equally divided into N areas of the same size along the direction parallel to the light bar for the television display screen, or the television display screen is divided into N areas of different sizes along the direction parallel to the light bar behind the television display screen. For example, considering the fact that the color cast in the area close to the light bar or away from the light bar is more obvious, and the color cast in the central area is weaker, the size of the area close to or away from the light bar may be smaller than the size of the central area, when dividing the television display screen.

a determining module 220, configured to determine an adjustment coefficient of red light and an adjustment coefficient of blue light in each area, according to a position of each area relative to a light bar for the television display screen.

In this embodiment, because each area is at a different position relative to the light bar, the intensity of spilling light may also be different in different areas. For example, the spilling blue light in the area close to the light bar is more than the spilling blue light in the area away from the light bar. That is, in different areas relative to the light bar, the adjustment range for red light is different with the adjustment rang for blue light. In this embodiment, according to the position of each area relative to the light bar, the adjustment coefficient of red light and the adjustment coefficient of blue light in each area are determined.

an adjusting module 230, configured to adjust an initial image in each area according to the adjustment coefficient of red light and the adjustment coefficient of blue light thereof, and displaying the adjusted image in each area on the television display screen.

In this embodiment, after determining the adjustment coefficients of the red light and the blue light in each area, the initial image in each area is adjusted according to the adjustment coefficients of the blue light and the red light thereof. The initial image in each area is adjusted, and then the adjusted image in each area is displayed on the television display screen.

In this embodiment, the television color cast adjustment apparatus 200 includes: the dividing module 210 being configured to divide the television display screen into a plurality of areas according to a predetermined manner, the determining module 220 being configured to determine the adjustment coefficient of red light and the adjustment coefficient of blue light in each area according to the position of each area relative to the light bar, the adjusting module 230 being configured to adjust the initial image in each area according to the adjustment coefficient of red light and the adjustment coefficient of blue light thereof, and display the adjusted image in each area on the television display screen. This embodiment, by dividing the television display screen into the plurality of areas, determining the adjustment coefficients of red light and blue light in each area, adjusting the image in each area according to the adjustment coefficients of red light and blue light thereof, and then displaying the adjusted image in each area on the television play screen, may solve the problem that color cast appears on television display screens which is caused by the glass light guide plate, thus viewing effect of TVs is improved.

Figure 5:
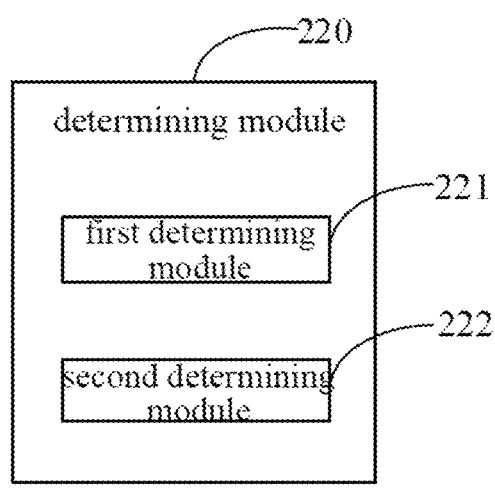
FIG. 5 is a detailed functional module diagram of the determining module 220 shown in FIG. 4 of the present disclosure.

Further, referring to FIG. 5, FIG. 5 is a detailed functional module diagram of the determining module 220 shown in FIG. 4 of the present disclosure. Based on the above embodiment as shown in FIG. 4, in this embodiment, the determining module 220 includes:

a first determining module 221, configured to determine a gain compensation coefficient of red light and a gain compensation coefficient of blue light in each area.

In this embodiment, the gain compensation coefficient of red light and the gain compensation coefficient of blue light in each area are determined, by testing and comparing the viewing effects of the television display screen multiple times. For example, after setting different gain compensation coefficients of red light and gain compensation coefficients of blue light in a same area of two or more television display screens, and inputting a same image at a same time, the television display screen with the best viewing effect is selected out. The gain compensation coefficient of red light and the gain compensation coefficient of blue light corresponding to the television display screen with the best viewing effect are taken as the gain compensation coefficient of red light and the gain compensation coefficient of blue light in this embodiment.

a second determining module 222, configured to respectively determine the adjustment coefficient of red light and the adjustment coefficient of blue light in each area, according to the position of each area relative to the light bar for the television display screen, the gain compensation coefficient of red light thereof, and the gain compensation coefficient of blue light thereof; the farther the distance of each area to the light bar for the television display screen, the smaller the adjustment coefficient of red light thereof, and the greater the adjustment coefficient of blue light thereof.

In this embodiment, the adjustment coefficient of red light and the adjustment coefficient of blue light in each area are respectively determined, according to the position of each area relative to the light bar, the gain compensation coefficient of red light and the gain compensation coefficient of blue light thereof. The adjustment coefficient of red light in the area is inversely proportional to the distance of the area to the light bar, namely, the farther the area is to the light bar, the smaller the adjustment coefficient of red light is. The adjustment coefficient of blue light in the area is proportional to the distance of the area to the light bar, namely, the closer the area is to the light bar, the larger the adjustment coefficient of blue light is.

In the determining module 220 of this embodiment, the gain compensation coefficients of the red light and the blue light in each area are determined; then, the adjustment coefficients of the red light and the blue light in each area are respectively determined, according to the position of each area relative to the light bar, the gain compensation coefficients of the red light and the blue light thereof. The farther the area is to the light bar, the smaller the adjustment coefficient of red light in the area is, and the larger the adjustment coefficient of blue light in the area is. The initial image in each area can be respectively adjusted according to the adjustment coefficients of the red light and the blue light in each area, and then the adjusted image in each area can be displayed on the television display screen.

Further, for a better explanation of the television color cast adjustment method, reference to FIG. 3, FIG. 3 is a schematic diagram of the television display screen being divided into the areas according to the television color cast adjustment method of the present disclosure. If the light bar is at the bottom of the television display screen (the light bar may be at the top of the television display screen, or at the left or right end of the television display screen), the area closest to the light bar is the first area, the area away from the light bar is the nth area, n is less than or equal to the total number of the areas N.

Based on the above embodiment as shown in FIG. 4, in the determining module 220 of this embodiment, the adjustment coefficient of red light in the nth area $C_R(n)$ is obtained by an equation $$C_R(n) = \frac{(k_R+k_B)/2}{N} * \frac{a}{255} * (N - b*n);$$

the adjustment coefficient of blue light in the nth area $C_B(n)$ is obtained by an equation $$C_B(n) = \frac{(k_R+k_B)/2}{N} * \frac{a}{255} * (c*n - N).$$

$k_R$ refers to the number of times of total internal reflection needed for the red light to pass through a television glass light guide plate, $k_B$ refers to the number of times of total internal reflection needed for the blue light to pass through the television glass light guide plate, "a" refers to a predetermined color gain value in each area, "b" refers to the gain compensation coefficient of red light in the nth area that is relative to the light bar for the television display screen, "c" refers to the gain compensation coefficient of blue light in the nth area that is relative to the light bar for the television display screen, N refers to the quantity of the divided areas, and "n" is a positive integer and n≤N.

$k_R$ and $k_B$ may be calculated by:
using the refractive index for light in medium n=c/v=1/sin C (c is the propagation speed of light in vacuum, v is the propagation speed of light in the medium, C is the total reflection angle for light in the medium), and the propagation speed of light in the medium v=f*λ, (λ is the wavelength of light), wherein, the frequency of light f propagating in the medium is constant. Taking a 55-inch television glass light guide plate as an example: if the length of the television glass light guide plate is 710 mm, the thickness is 3 mm, the refractive index for red light in the glass light guide plate is 1.21, the refractive index for blue light in the glass light guide plate is 1.86; according to $$C = \arcsin\frac{1}{n},$$

the total reflection angle of red light in the glass light guide plate is calculated to be 55.6°, and the total reflection angle of blue light in the glass light guide plate is calculated to be is 31°; and if that a beam of light is incident from the side of the glass light guide plate along the length of the glass light guide plate, and is emitted from the other side, then the number of times of total internal reflections for the beam of light to pass through the glass light guide plate is 710/(3*tan C). Thus, it can be calculated that the number of times of total internal reflections for red light to pass through the glass light guide plate is 154, and the number of times of total internal reflections for blue light to pass through the glass light guide plate is 364.

In this embodiment, for the purpose of a smooth transition between adjusted images in adjacent areas when displaying, so as to improve viewing effect, the color gain value a is predetermined in each area. The color gain value a in each area may be determined according to a backlight intensity of each area in the television display screen. In this embodiment, the value of a is preferably between 0 and 10.

Each color has 256 levels of brightness when displaying the image. The color has the weakest brightness at 0 level, and the color has the strongest brightness at 255 level. In this embodiment, a/255 represents the ratio of the color gain a in each area to the highest level of color brightness.

For the adjustment coefficient of red light in the nth area $C_R(n)$, with the increasing value of n, the value of "N−b*n" gradually decreases, and the adjustment coefficient of red light in the nth area $C_R(n)$ also gradually decreases; for the adjustment coefficient of blue light in the nth area $C_B(n)$, with the increasing value of n, the value of "c*n−N" gradually increases, and the adjustment coefficient of blue light in the nth area $C_B(n)$ also gradually increases.

In this embodiment, the adjustment coefficients of the red light and the blue light in each area are respectively determined according to the position of each area relative to the light bar, the gain compensation coefficients of the red light and the blue light in each area. With the increasing distance of the area to the light bar, the adjustment coefficient of red light thereof gradually decreases, the adjustment coefficient of blue light thereof gradually increases. As such, more red light is compensated in the area close to the light bar, more blue light is compensated in the area away from the light bar, which solves the problem that color cast appears on television display screens which is caused by the glass light guide plate, thus the viewing effect of TVs is improved.

Further, based on the above embodiment as shown in FIG. 4, in the adjusting module 230 of this embodiment, the operation of adjusting an initial image in each area according to the adjustment coefficient of red light and the adjustment coefficient of blue light in each area includes:

obtaining image information of the adjusted image in the nth area $A_R(n)$, $A_G(n)$, $A_B(n)$, by equations:

$$A_R(n)=B_R(n)*[1+C_B(n)],$$

$$A_G(n)=B_G(n)*1,$$

$$A_B(n)=B_B(n)*[1+C_B(n)];$$

$B_R(n)$, $B_G(n)$, $B_B(n)$ refer to three color channels of red (R), green (G), and blue (B), corresponding to the initial image in the nth area.

In this embodiment, the person skilled in the art can understand that each image includes one or more color channels. For example, the RGB image includes three color channels of red (R), green (G), and blue (B), each color channel stores information of color elements in the image. The colors in all the color channels come together to create the full color of pixels in the image.

In this embodiment, image information in each area varies with the adjustment coefficients of red light and blue light. When $C_R(n)=0$, $A_R(n)=B_R(n)$, meaning that it is neither to increase nor decrease red light in the area; when $C_R(n)>0$, $A_R(n)>B_R(n)$, meaning that it is to increase red light in the area, and with the increasing value of $C_R(n)$, the increased red light is more; when $C_R(n)<0$, $A_R(n)<B_R(n)$, meaning that it is to decrease red light in the area, and with the decreasing value of $C_R(n)$, the decreased red light is more. In addition, when $C_B(n)=0$, $A_B(n)=B_B(n)$, meaning that it is neither to increase nor decrease blue light in the area; when $C_B(n)>0$, $A_B(n)>B_B(n)$, meaning that it is to increase blue light in the area, and with the increasing value of $C_R(n)$, the increased blue light is more; when $C_B(n)<0$, $A_B(n)<B_B(n)$, meaning that it is to decrease blue light in the area, and with the decreasing value of $C_R(n)$, the decreased blue light is more.

Because the number of times of total internal reflections for green light to pass through the television glass light guide plate is between that for red light and that for blue light, green light in each area of the television display screen is not adjusted, namely $A_G(n)=B_G(n)$.

After adjusting initial image information in each area $B_R(n)$, $B_G(n)$, and $B_B(n)$, the adjusted image information $A_R(n)$, $A_G(n)$, and $A_B(n)$ is displayed on the television display screen.

In this embodiment, the initial image in each area is adjusted according to the adjustment coefficient of red light and the adjustment coefficient of blue light in each area. As such, more red light is compensated in the area close to the light bar, more blue light is compensated in the area away from the light bar; or more blue light is reduced in the area close to the light bar, more red light is reduced in the area away from the light bar. After that, the adjusted images are displayed on the television display screen, which may solve the problem that the color cast appears on television display screens which is caused by the glass light guide plate, thus the viewing effect of TVs is improved.

The foregoing description merely portrays some illustrative embodiments in accordance with the disclosure and therefore is not intended to limit the patentable scope of the disclosure. Any equivalent structure or flow transformations that are made taking advantage of the specification and accompanying drawings of the disclosure and any direct or indirect applications thereof in other related technical fields shall all fall in the scope of protection of the disclosure.

What is claimed is:

1. A television color cast adjustment method, comprising:
dividing a television display screen into a plurality of areas according to a predetermined manner;
determining an adjustment coefficient of red light and an adjustment coefficient of blue light in each area, according to a position of each area relative to a light bar for the television display screen; and
adjusting initial image in each area according to the adjustment coefficient of red light and the adjustment coefficient of blue light thereof, and displaying the adjusted image of each area on the television display screen;
wherein the operation of determining an adjustment coefficient of red light and an adjustment coefficient of blue light in each area, according to a position of each area relative to a light bar for the television display screen comprises:
determining a gain compensation coefficient of red light and a gain compensation coefficient of blue light in each area; and
respectively determining the adjustment coefficient of red light and the adjustment coefficient of blue light in each area, according to the position of each area relative to the light bar for the television display screen, the gain compensation coefficient of red light thereof, and the gain compensation coefficient of blue light thereof;
wherein, the farther the distance of each area to the light bar for the television display screen is, the smaller the adjustment coefficient of red light thereof is, and the greater the adjustment coefficient of blue light thereof is.

2. The method of claim 1, wherein, the operation of dividing a television display screen into a plurality of areas according to a predetermined manner comprises:
dividing the television display screen into N areas along a direction parallel to the light bar for the television display screen, wherein N is a positive integer.

3. The method of claim 2, wherein, the operation of dividing the television display screen into N areas along a direction parallel to the light bar for the television display screen comprises:
dividing the television display screen into N areas of a same size along the direction parallel to the light bar for the television display screen; or dividing the television display screen into N areas of different sizes along the direction parallel to the light bar for the television display screen.

4. The method of claim 1, wherein, the operation of respectively determining the adjustment coefficient of red light and the adjustment coefficient of blue light in each area according to the position of each area relative to the light bar for the television display screen, the gain compensation coefficient of red light thereof, and the gain compensation coefficient of blue light thereof comprises:
obtaining an adjustment coefficient of red light $C_R(n)$ in the nth area by an equation $$C_R(n) = \frac{(k_R+k_B)/2}{N} * \frac{a}{255} * (N - b*n);$$

obtaining an adjustment coefficient of blue light $C_B(n)$ in the nth area by an equation $$C_B(n) = \frac{(k_R+k_B)/2}{N} * \frac{a}{255} * (c*n - N);$$

wherein, $k_R$ refers to the number of times of total internal reflection needed for the red light to pass through a television glass light guide plate, $k_B$ refers to the number of times of total internal reflection needed for the blue light to pass through the television glass light guide plate, "a" refers to a predetermined color gain value in each area, "b" refers to the gain compensation coefficient of red light in the nth area that is relative to the light bar for the television display screen, "c" refers to the gain compensation coefficient of blue light in the nth area that is relative to the light bar for the television display screen, N refers to the quantity of the divided areas, and "n" is a positive integer and n≤N.

5. The method of claim 4, wherein, the operation of adjusting initial image in each area according to the adjustment coefficient of red light and the adjustment coefficient of blue light thereof comprises:

obtaining image information of the adjusted image $A_R(n)$, $A_G(n)$, and $A_B(n)$ in the nth area, by equations:

$A_R(n) = B_R(n)*[1+C_R(n)]$, $A_G(n) = B_G(n)*1$, $A_B(n) = B_B(n)*[1+C_B(n)]$;

wherein, $B_R(n)$, $B_G(n)$, and $B_B(n)$ refer to three color channels of red (R), green (G), and blue (B), corresponding to the initial image in the nth area.

6. A television color cast adjustment apparatus, wherein, the apparatus comprises:

a dividing module, configured to divide a television display screen into a plurality of areas according to a predetermined manner;

a determining module, configured to determine an adjustment coefficient of red light and an adjustment coefficient of blue light in each area, according to a position of each area relative to a light bar for the television display screen; and an adjusting module, configured to adjust initial image in each area according to the adjustment coefficient of red light and the adjustment coefficient of blue light thereof, and displaying the adjusted image of each area on the television display screen;

wherein the determining module specifically comprises:

a first determining module, configured to determine a gain compensation coefficient of red light and a gain compensation coefficient of blue light in each area; and a second determining module, configured to respectively determine the adjustment coefficient of red light and the adjustment coefficient of blue light in each area, according to the position of each area relative to the light bar for the television display screen, the gain compensation coefficient of red light thereof, and the gain compensation coefficient of blue light thereof;

wherein, the farther the distance of each area to the light bar for the television display screen is, the smaller the adjustment coefficient of red light thereof is, and the greater the adjustment coefficient of blue light thereof is.

7. The apparatus of claim 6, wherein, the dividing module is configured to:

divide the television display screen into N areas along a direction parallel to the light bar for the television display screen, wherein N is a positive integer.

8. The method of claim 7, wherein, the dividing module is configured to:

divide the television display screen into N areas of a same size along the direction parallel to the light bar for the television display screen; or divide the television display screen into N areas of different sizes along the direction parallel to the light bar for the television display screen.

9. The apparatus of claim 6, wherein, the second determining module is specifically configured to:

obtain an adjustment coefficient of red light $C_R(n)$ in the nth area by an equation $$C_R(n) = \frac{(k_R + k_B)/2}{N} * \frac{a}{255} * (N - b*n);$$

obtain an adjustment coefficient of blue light $C_B(n)$ in the nth area by an equation $$C_B(n) = \frac{(k_R + k_B)/2}{N} * \frac{a}{255} * (c*n - N);$$

wherein, $k_R$ refers to the number of times of total internal reflection needed for the red light to pass through a television glass light guide plate, $k_B$ refers to the number of times of total internal reflection needed for the blue light to pass through the television glass light guide plate, "a" refers to a predetermined color gain value in each area, "b" refers to the gain compensation coefficient of red light in the nth area that is relative to the light bar for the television display screen, "c" refers to the gain compensation coefficient of blue light in the nth area that is relative to the light bar for the television display screen, N refers to the quantity of the divided areas, and "n" is a positive integer and n≤N.

10. The apparatus of claim 9, wherein, the adjusting module is configured to:

obtain image information of the adjusted image $A_R(n)$, $A_G(n)$, and $A_B(n)$ in the nth area, by equations:

$A_R(n) = B_R(n)*[1+C_R(n)]$, $A_G(n) = B_G(n)*1$, $A_B(n) = B_B(n)*[1+C_B(n)]$;

wherein, $B_R(n)$, $B_G(n)$, and $B_B(n)$ refer to three color channels of red (R), green (G), and blue (B), corresponding to the initial image in the nth area.

* * * * *